United States Patent
Angell, IV et al.

(10) Patent No.: US 12,466,755 B2
(45) Date of Patent: Nov. 11, 2025

(54) METHODS OF FORMING SILICA-TITANIA GLASS ARTICLES WITH REDUCED STRIAE DIMENSIONS

(71) Applicant: CORNING INCORPORATED, Corning, NY (US)

(72) Inventors: William Robert Angell, IV, Painted Post, NY (US); John Edward Maxon, Canton, NY (US); Jeffrey Lee Sunderland, Colton, NY (US)

(73) Assignee: Corning Incorporated, Corning, NY (US)

( * ) Notice: Subject to any disclaimer, the term of this patent is extended or adjusted under 35 U.S.C. 154(b) by 183 days.

(21) Appl. No.: 18/127,351

(22) Filed: Mar. 28, 2023

(65) Prior Publication Data

US 2023/0312387 A1    Oct. 5, 2023

Related U.S. Application Data

(60) Provisional application No. 63/326,427, filed on Apr. 1, 2022.

(51) Int. Cl.
*C03B 19/14* (2006.01)
(52) U.S. Cl.
CPC ...... *C03B 19/1423* (2013.01); *C03B 2201/42* (2013.01); *C03B 2207/32* (2013.01); *C03B 2207/36* (2013.01)
(58) Field of Classification Search
None
See application file for complete search history.

(56) References Cited

U.S. PATENT DOCUMENTS

| | | | |
|---|---|---|---|
| 5,696,038 A * | 12/1997 | Maxon | C03B 19/1484 65/17.5 |
| 6,376,010 B1 * | 4/2002 | Blackwell | C03C 3/06 65/435 |
| 7,155,936 B2 | 1/2007 | Dawes et al. | |
| RE40,586 E | 11/2008 | Hrdina et al. | |
| 2003/0056538 A1 | 3/2003 | Collins et al. | |
| 2005/0245383 A1 | 11/2005 | Iwahashi et al. | |
| 2007/0137252 A1 | 6/2007 | Maxon et al. | |
| 2010/0107696 A1 | 5/2010 | Maxon et al. | |
| 2017/0267569 A1 * | 9/2017 | Cook | C03B 19/1407 |
| 2021/0214266 A1 * | 7/2021 | Fekety | C03B 37/01446 |

FOREIGN PATENT DOCUMENTS

EP    1608599 B1    10/2007

OTHER PUBLICATIONS

CN 108467184 machine translation, Nie et al., A Large-size Highly Uniform Quarz Glass, Aug. 2018 (Year: 2018).*
International Search Report and Written Opinion of the International Searching Authority; PCT/US2023/016223; mailed on Jul. 7, 2023, 12 pages; European Patent Office.

* cited by examiner

*Primary Examiner* — Queenie S Dehghan
(74) *Attorney, Agent, or Firm* — Amy T. Lang

(57) ABSTRACT

A process for producing a glass body, the process including flowing oxygen gas from a burner in a furnace at a flow rate of greater than 12.0 standard liters per minute and flowing a precursor gas mixture from the burner. The process further including oxidizing the precursor gas mixture with the oxygen gas to form glass particles and depositing the glass particles on a collection cup to form the glass body.

15 Claims, 9 Drawing Sheets

FIG. 7

T$_{zc}$ OF SAMPLES OF GLASS IN A BOULE

| RADIUS OF BOULE (INCHES) | 1 | 2 | 3 | 4 | 5 | 6 | 7 | 8 | 9 | 10 | 11 | 12 | 13 | 14 | 15 | 16 | 17 | 18 | 19 | STD |
|---|---|---|---|---|---|---|---|---|---|---|---|---|---|---|---|---|---|---|---|---|
| PORTION A | | | | | | | | | | | | | | | | | | | | |
| 0.50 | 24.2 | 25.0 | 23.7 | 23.7 | 24.2 | 25.0 | 25.6 | 25.5 | 26.7 | 25.9 | 25.4 | 24.8 | 25.7 | 24.9 | 24.8 | 25.7 | 25.8 | 27.0 | 27.8 | 1.5 |
| 0.75 | 24.2 | 24.1 | 24.0 | 23.4 | 23.7 | 23.9 | 25.2 | 24.9 | 26.3 | 25.5 | 25.2 | 24.4 | 25.0 | 24.3 | 24.5 | 24.8 | 25.6 | 26.3 | 27.2 | 1.3 |
| 1.00 | 23.8 | 23.6 | 23.5 | 22.9 | 23.3 | 23.4 | 24.3 | 24.5 | 25.8 | 25.2 | 25.0 | 24.1 | 24.5 | 24.1 | 24.3 | 24.2 | 25.0 | 25.7 | 26.8 | 1.3 |
| 1.25 | 23.6 | 23.5 | 23.0 | 23.0 | 23.3 | 23.3 | 24.2 | 24.8 | 24.9 | 25.5 | 25.2 | 24.3 | 24.6 | 24.5 | 24.2 | 23.9 | 24.6 | 25.4 | 26.3 | 1.1 |
| 1.50 | 23.8 | 22.9 | 23.2 | 22.8 | 23.2 | 23.1 | 24.0 | 24.2 | 25.2 | 24.9 | 25.0 | 23.8 | 23.8 | 24.2 | 24.1 | 23.8 | 24.2 | 25.0 | 25.1 | 1.0 |
| 1.75 | 23.5 | 22.4 | 23.5 | 22.3 | 22.9 | 22.2 | 23.6 | 23.7 | 24.2 | 24.4 | 24.5 | 23.6 | 23.6 | 23.9 | 23.6 | 23.6 | 23.5 | 24.8 | 24.8 | 0.9 |
| 2.00 | 23.1 | 21.7 | 22.9 | 21.6 | 22.5 | 21.5 | 22.5 | 23.1 | 23.4 | 24.3 | 24.2 | 22.9 | 23.0 | 23.2 | 23.0 | 23.2 | 22.6 | 24.0 | 24.3 | 0.9 |
| PORTION X | | | | | | | | | | | | | | | | | | | | |
| 2.25 | | | | | | | | | | | | | | | | | | | | |
| 2.50 | | | | | | | | | | | | | | | | | | | | |
| 2.75 | | | | | | | | | | | | | | | | | | | | |
| PORTION B | | | | | | | | | | | | | | | | | | | | |
| 3.00 | 23.7 | 22.6 | 24.2 | 21.5 | 23.4 | 23.0 | 22.7 | 23.8 | 25.6 | 24.2 | 26.4 | 26.5 | 25.5 | 24.1 | 25.0 | 24.4 | 24.4 | 25.1 | 26.2 | 1.5 |
| 3.25 | 23.0 | 20.9 | 24.0 | 20.9 | 22.9 | 22.1 | 27.9 | 23.1 | 24.8 | 24.0 | 26.4 | 25.9 | 25.1 | 23.3 | 25.0 | 24.1 | 23.9 | 24.4 | 24.8 | 1.5 |
| 3.50 | 22.4 | 21.8 | 24.3 | 21.1 | 22.4 | 21.4 | 20.9 | 23.5 | 24.0 | 24.6 | 27.0 | 26.4 | 26.1 | 23.6 | 23.7 | 24.1 | 23.3 | 24.0 | 24.5 | 1.7 |
| 3.75 | 23.1 | 24.1 | 23.2 | 22.3 | 22.7 | 22.0 | 21.8 | 23.6 | 24.9 | 25.0 | 26.9 | 26.9 | 26.7 | 24.6 | 24.4 | 25.4 | 23.9 | 24.9 | 24.6 | 1.6 |
| 4.00 | 25.1 | 23.6 | 24.2 | 23.1 | 23.6 | 23.0 | 22.2 | 23.6 | 25.5 | 25.8 | 26.7 | 27.2 | 27.4 | 25.6 | 24.8 | 25.2 | 24.5 | 25.3 | 25.8 | 1.5 |
| 4.25 | 25.4 | 24.3 | 24.5 | 24.0 | 22.9 | 23.5 | 22.8 | 24.5 | 25.6 | 22.2 | 26.7 | 28.4 | 28.7 | 26.4 | 25.0 | 25.5 | 25.4 | 25.8 | 25.9 | 1.7 |
| 4.50 | 26.0 | 24.6 | 24.0 | 24.8 | 23.2 | 23.8 | 23.2 | 23.8 | 26.2 | 27.0 | 27.4 | 28.4 | 29.8 | 26.6 | 26.6 | 25.8 | 26.5 | 26.6 | 26.3 | 1.8 |
| 4.75 | 26.0 | 23.7 | 24.1 | 23.7 | 22.8 | 24.1 | 22.2 | 23.2 | 24.9 | 26.3 | 26.9 | 28.2 | 28.7 | 27.0 | 26.3 | 25.7 | 26.0 | 25.5 | 26.0 | 1.6 |
| 5.00 | 25.1 | 22.9 | 22.8 | 23.4 | 22.1 | 23.4 | 22.9 | 22.2 | 24.3 | 24.9 | 26.2 | 27.9 | 28.2 | 26.7 | 22.9 | 25.1 | 25.0 | 25.8 | 25.1 | 1.8 |
| 5.25 | 25.0 | 22.7 | 22.9 | 23.4 | 22.8 | 23.2 | 22.2 | 22.1 | 23.7 | 23.8 | 24.9 | 27.4 | 27.5 | 27.5 | 26.2 | 25.6 | 24.4 | 25.1 | 24.7 | 1.6 |
| 5.50 | 24.6 | 22.6 | 22.8 | 21.9 | 22.5 | 23.2 | 22.9 | 22.2 | 23.7 | 23.1 | 23.1 | 25.0 | 25.7 | 26.1 | 27.3 | 26.4 | 25.7 | 24.5 | 24.6 | 1.7 |
| 5.75 | 23.0 | 23.2 | 22.7 | 21.5 | 22.9 | 22.3 | 22.0 | 21.3 | 22.0 | 21.3 | 21.3 | 24.2 | 23.9 | 24.6 | 25.9 | 26.0 | 25.9 | 25.9 | 24.7 | 1.8 |
| 6.00 | 19.9 | 20.9 | 22.1 | 20.8 | 22.4 | 22.6 | 21.1 | 20.3 | 21.1 | 20.6 | 20.2 | 22.4 | 22.0 | 22.8 | 23.4 | 23.4 | 24.7 | 25.4 | 25.8 | 1.8 |
| 6.25 | 19.0 | 17.9 | 23.1 | 19.5 | 21.5 | 21.9 | 22.1 | 19.5 | 20.7 | 19.2 | 19.6 | 20.8 | 21.7 | 21.8 | 22.8 | 22.8 | 24.1 | 24.5 | 24.8 | 1.8 |

# METHODS OF FORMING SILICA-TITANIA GLASS ARTICLES WITH REDUCED STRIAE DIMENSIONS

This application claims the benefit of priority under 35 U.S.C § 120 of U.S. Provisional Application Ser. No. 63/326,427 filed on Apr. 1, 2022, the content of which is relied upon and incorporated herein by reference in its entirety.

FIELD

The present disclosure generally relates to methods of forming silica-titania glass articles with reduced striae dimensions, and more particularly relates to methods of forming silica-titania glass articles by optimizing burner conditions. The glass articles may be suitable for use in extreme ultraviolet lithography applications.

BACKGROUND

Extreme ultraviolet (EUV) lithography uses optics to illuminate, project, and reduce pattern images to form integrated circuit patterns. The use of extreme ultraviolet radiation is beneficial in that smaller integrated circuit features can be achieved. The optics for EUV lithography are currently made from low thermal expansion glass, such as silica-titania glass. One example of a suitable silica-titania glass is ultra-low expansion (ULE) glass, which is traditionally made by a chemical vapor deposition (CVD) process. In a CVD process, high purity precursors are injected into flames to form fine particles, which are then directed towards the surface of glass. In such a CVD process, the glass is formed in layer deposits.

But ULE glass made in accordance with such a CVD process often contains striae. Striae are compositional non-uniformities that adversely affect optical transmission in the glass. Striae can be a result of thermal variations of the growing glass as the fine particles are deposited. The occurrence of striae in the glass results in thin alternating layers of glass with different coefficient of thermal expansion (CTE) values and, therefore, alternating planes of compression and tension between the layers.

SUMMARY

The inclusion of striae in glass can impact surface finish of the glass at an angstrom root mean square (rms) level, which can adversely affect the polishability of the glass. More specifically, polishing glass that contains striae can result in unequal material removal, which in turn results in unacceptable surface roughness. This can be problematic for stringent applications like EUV lithography articles. For example, polishing glass containing striae may result in a mid-frequency surface structure on the glass that can cause image degradation, for example when the glass is used in mirrors in EUV lithography projection systems.

Aspects of the present disclosure are directed to processes for producing silica-titania glass articles with reduced striae dimensions. For example, the striae may be reduced in size and/or spacing between adjacent striae. As discussed further below, the processes disclosed herein optimize burner conditions to reduce the striae dimensions in the produced glass. In some embodiments, the flow rate of oxygen and the flow rate of silica and titania precursors are optimized to reduce the striae dimensions in the produced glass. The produced glass may form articles suitable for use in extreme ultraviolet lithography applications.

Aspects of the present disclosure include a process for producing a glass body, the process comprising flowing oxygen gas from a burner in a furnace at a flow rate of greater than 12.0 standard liters per minute and flowing a precursor gas mixture from the burner. The process further comprises oxidizing the precursor gas mixture with the oxygen gas to form glass particles and depositing the glass particles on a collection cup to form the glass body.

Aspects of the present disclosure include a process for producing a glass body, the process comprising flowing oxygen gas and a precursor gas mixture from a burner. The precursor gas mixture flows at a rate of less than 5.1 grams/minute. The process further comprises oxidizing the precursor gas mixture with the oxygen gas to form glass particles and depositing the glass particles on a collection cup to form the glass body.

Aspects of the present disclosure also include a process for producing a glass body, the process comprising flowing oxygen gas from a burner in a furnace at a flow rate of greater than 12.0 standard liters per minute and flowing a precursor gas mixture from the burner at a flow rate of less than 5.1 grams/minute. The process further comprises oxidizing the precursor gas mixture with the oxygen gas to form glass particles and depositing the glass particles on a collection cup in the furnace to form the glass body. The precursor gas mixture comprises a silicon-containing precursor and a titanium-containing precursor.

Aspects of the present disclosure include a glass body comprising a silicon-containing component and a titanium-containing component and striae dispersed along a length of the glass body. The striae each having a length and a height such that an average height of the striae along a length of the glass body is within a range of about 0.25 nm to about 10 nm.

BRIEF DESCRIPTION OF THE DRAWINGS

FIG. 7 depicts the standard deviation of zero temperature crossing measurements in samples of an exemplary glass boule made according to the embodiments of the present disclosure and made using a standard process;

DETAILED DESCRIPTION

Figure 1:
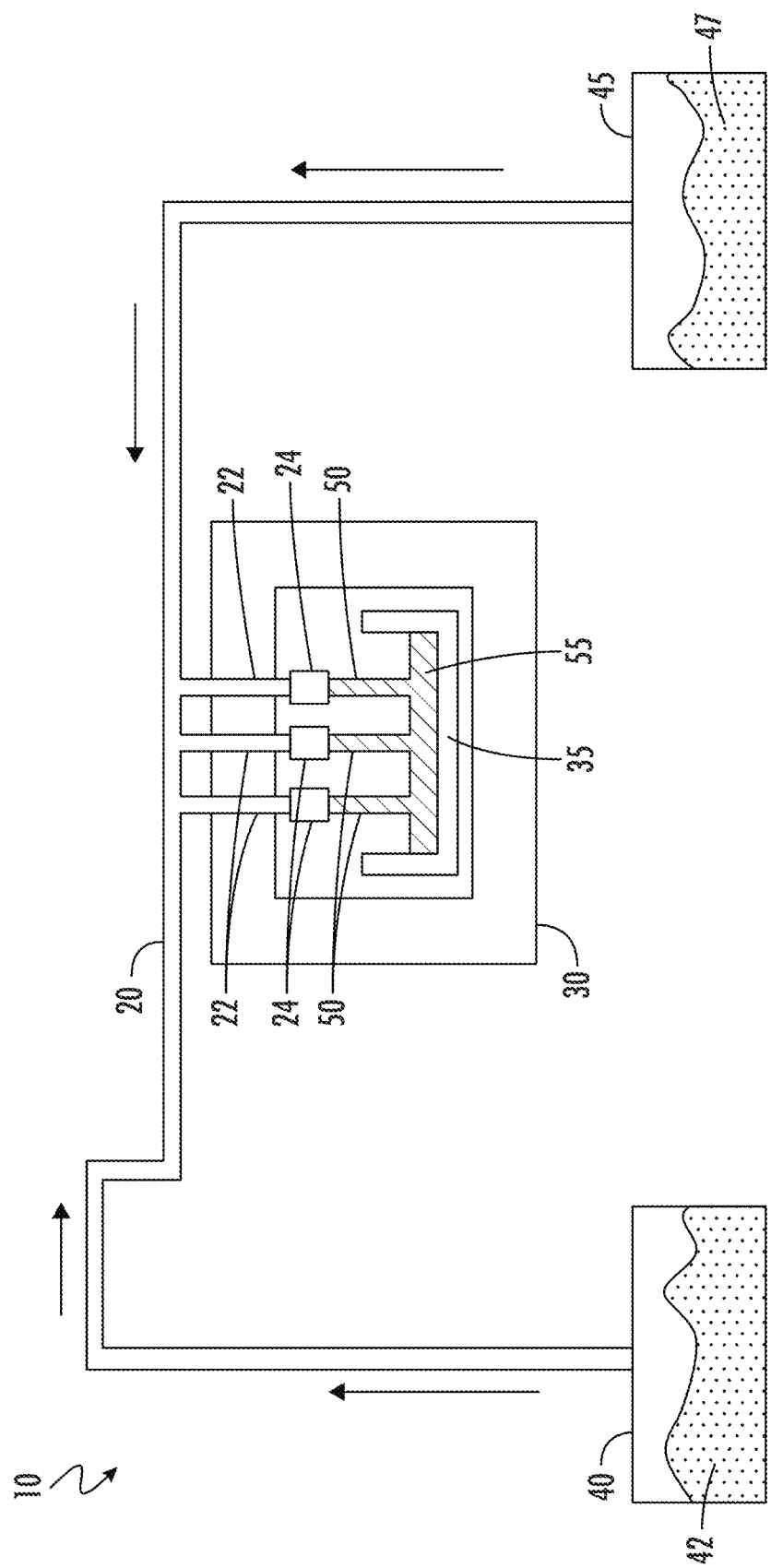
FIG. 1 is a schematic illustration of a system used for manufacturing silica-titania ultra low expansion glass, according to embodiments of the present disclosure.

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

It is also important to note that the construction and arrangement of the elements of the disclosure, as shown in the exemplary embodiments, is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel and nonobvious teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present disclosure. Other substitutions, modifications, changes, and omissions may be made in the design, operating conditions, and arrangement of the desired and other exemplary embodiments without departing from the spirit of the present disclosure.

Reference will now be made in detail to the exemplary embodiments of the disclosure, examples of which are illustrated in the accompanying drawings. Whenever possible, the same reference numbers will be used throughout the drawings to refer to the same or like parts.

Referring now to FIG. 1, an exemplary system 10 to produce a glass body 55 is shown. System 10 comprises a distribution system 20 and a furnace 30 that receives glass particles to produce glass body 55, as discussed further below.

Glass body 55 may form a boule. As used herein the term "boule" means any silica-titania glass body having a length and/or width in the range of about 0.1 m to about 2 m and a thickness in the range of about 1 cm to about 225 cm. For example, a circular boule can have a diameter of about 0.5 m and a thickness of about 10 cm. In another embodiment, a boule has a length and a width of about 15 cm and a thickness of about 7 cm. However, other boule dimensions as are known in the art may be used.

In system 10, distribution system 20 is connected to vessels 40, 45 that are each configured to hold precursor materials for glass body 55. For example, vessel 40 is configured to hold a high purity silicon-containing feedstock or precursor 42 and vessel 45 is configured to hold a high purity titanium-containing feedstock or precursor 47. The feedstock or precursor materials are typically siloxanes, alkoxides and/or tetrachlorides containing titanium or silicon. In some embodiments, precursor 42 is octamethylcyclotetrasiloxane, and in some embodiments precursor 47 is titanium isopropoxide.

Vessels 40, 45 may each be connected to various inlets supplying, for example, a carrier gas into the vessel to help deliver the precursors 42, 47 to furnace 30. In some embodiments, precursors 42, 47 are mixed with nitrogen gas to prevent saturation of the precursor material.

Figure 2:
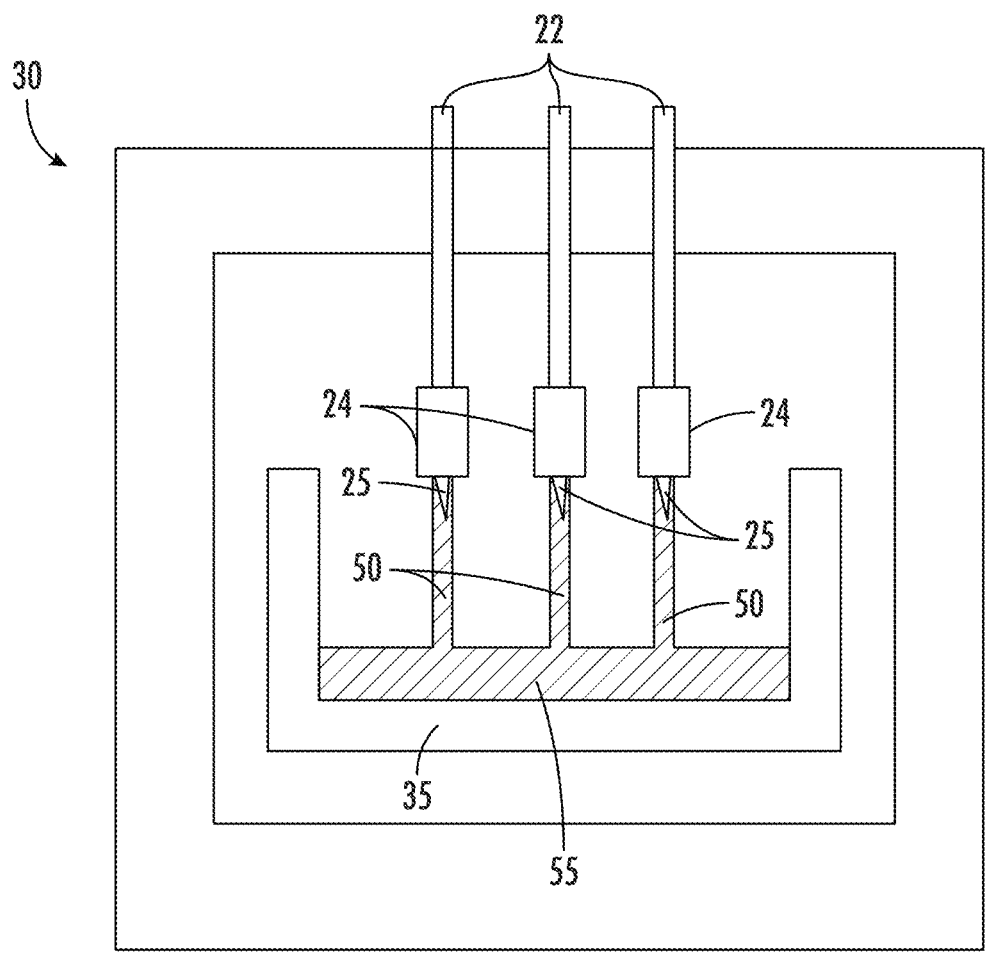
FIG. 2 is an enlarged view of a furnace of the system of FIG. 1, according to embodiments of the present disclosure.

The silicon-containing precursor 42 and the titanium-containing precursor 47 may be mixed together within distribution system 20 to form a vaporous, titanium-containing silica glass precursor mixture. This vaporous (gas) mixture is then delivered through conduits 22 of distribution system 20 and to burners 24. As shown in FIG. 1, burners 24 are disposed within furnace 30 and are configured to deposit titanium-containing silica glass particles 50 to a collection cup 35 within furnace 30. More specifically, and as shown in FIG. 2, burners 24 each produce a burner flame 25 that heats and oxidizes the vaporous, titanium-containing silica glass precursor mixture so that this vaporous precursor mixture changes from the gas state to a liquid state, thus forming glass particles 50. The heat from burner flames 25 oxidizes the vaporous precursor mixture and reacts with carbon and hydrogen in the precursor mixture. The carbon is oxidized to carbon dioxide ($C_2O$), which is released as a byproduct, and the hydrogen forms water ($H_2O$). The resulting compound is a glass particle 50 in a liquid state. Glass particles 50 are liquid droplets of glass, such that the droplets each have an average diameter of about 0.1 microns. The liquid droplets of glass are very small and flow downward in furnace 30 into collection cup 35.

Collection cup 35 is a revolving member disposed within furnace 30 that receives the glass particles 50 as they accumulate to form glass body 55. Glass particles 50 (and, thus, glass body 55) take the shape of collection cup 35, which is the final shape of the produced boule. After formation of glass body 55 in collection cup 35, glass body 55 is cooled in furnace 30 and then removed as the produced boule. But the boule may be subjected to further downstream processing such as, for example, polishing, cleaning, annealing, etching, and chamfering.

Glass body 55 (and, thus, the produced boule) with the reduced striae dimensions (as discussed further below) is produced without any mixing of the molten glass in collection cup 35 (other than the revolving motion of collection cup 35). Instead, glass body 55 (and, thus, the produced boule) with the reduced striae dimensions is prepared by depositing glass particles 50 directly onto the accumulating glass body 50.

Figure 3:
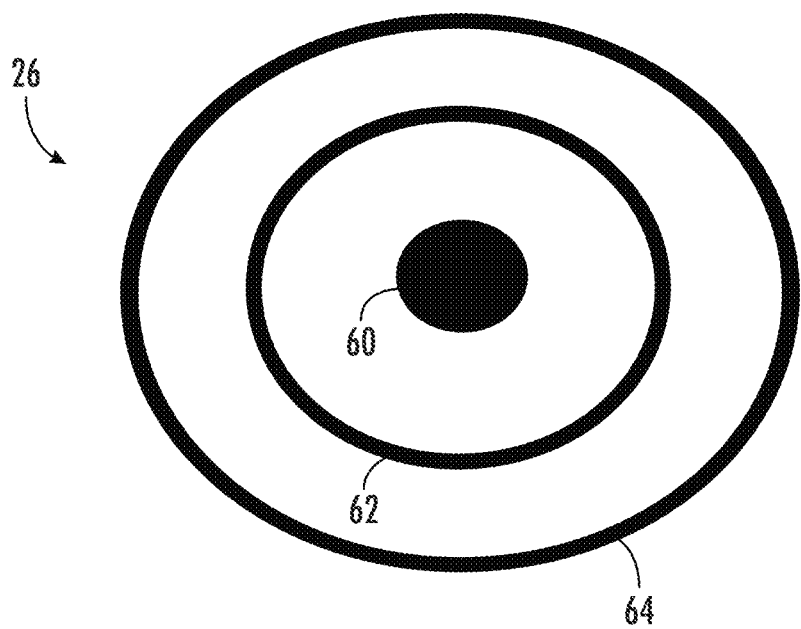
FIG. 3 shows an enlarged view of a bottom-end surface of a burner of the furnace of FIG. 1.

FIG. 3 shows an exemplary bottom-end surface 26 of a burner 24. Surface 26 may be the surface of burner 24 disposed closest to collection cup 35, as shown in the configuration of FIG. 2. With reference again to FIG. 3, surface 26 of each burner 24 comprises a plurality of apertures. More specifically, surface 26 comprises a central aperture 60, a second aperture 62, and one or more additional apertures 64. The vaporous, titanium-containing silica glass precursor mixture may be ejected from central aperture 60 of burners 24. Thus, the precursor mixture is ejected from burners 24 as a gas, which is then heated and oxidized to form glass particles 50, as also discussed above. The glass particles 50 are heated by burner flame 25, which flows out of and from second aperture 62. In order to produce burner flame 25, an oxygen gas may flow from second aperture 62 and, upon combustion with a fuel, forms burner flame 25 ejected from second aperture 62. Burners 24 may each have one or more inlet ports (not shown) for the flow of oxygen gas and fuel into burners 24.

A length of burner flame 25 from surface 26 may be sufficient to heat and oxidize the vaporous precursor gas flowing from first aperture 60 to transform it into glass particles 50. In some embodiments, the length of burner flame 25 is about 5 inches to about 10 inches.

Figure 4:
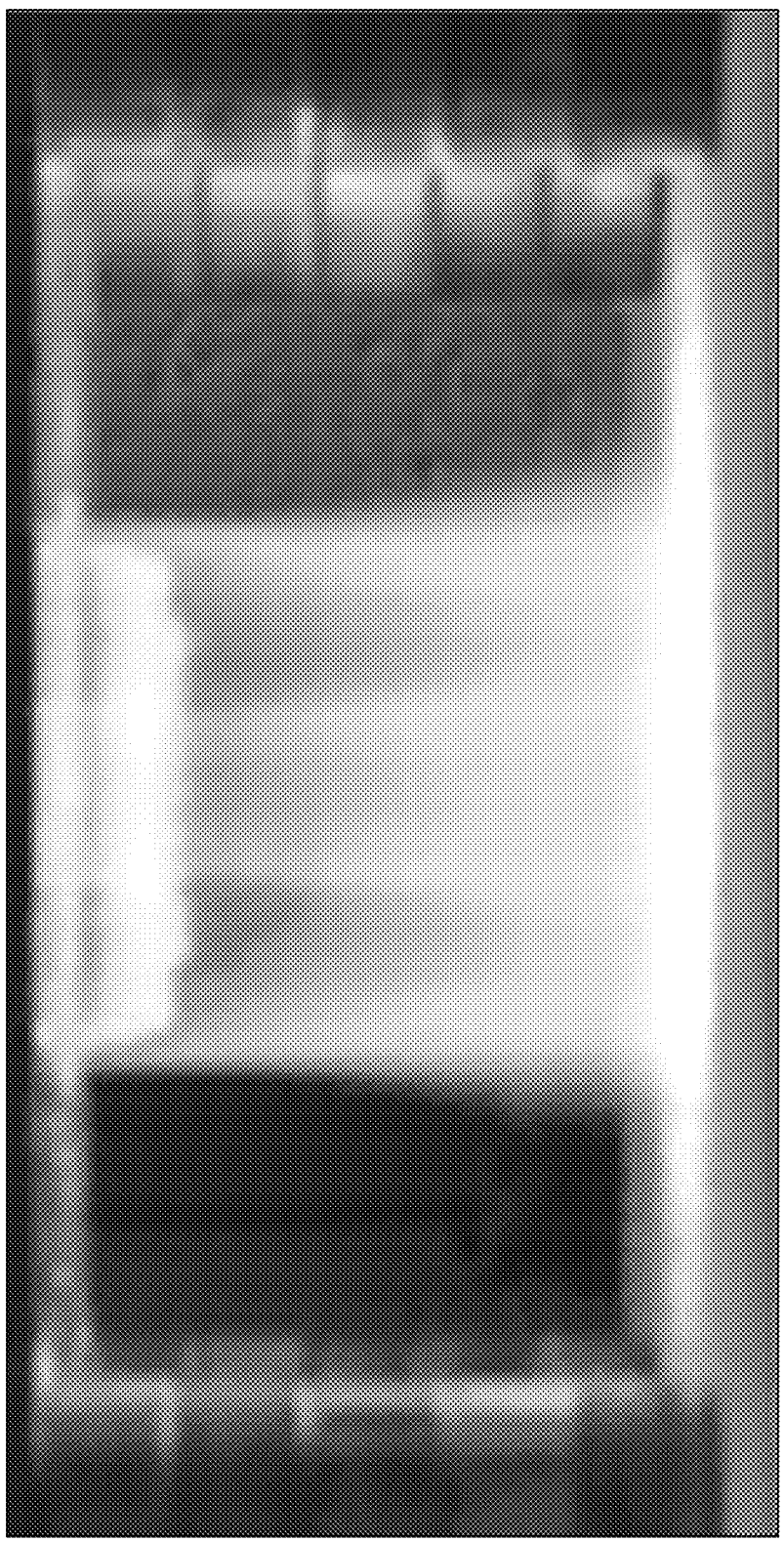
FIG. 4 shows flames ejected from the bottom-end surface of the burner of FIG. 3.

As shown in FIG. 3, second aperture 62 may be concentric with and radially outward of central aperture 60. Furthermore, the additional aperture(s) 64 may also be concentric with and radially outward of both central aperture 60 and second aperture 62. Although shown in FIG. 3 as a single, unitary aperture, in other embodiments, second aperture 62 may be comprised of a plurality of separate and discrete apertures. Furthermore, the additional aperture(s) 64 may also each be comprised of a plurality of separate and discrete apertures. The additional apertures(s) 64 may be configured for the flow of a carrier gas, precursor mixture, oxygen gas, and/or fuel. In some embodiments, the additional aperture(s) 64 forms a second flame (in addition to burner flame 25) to heat glass body 55. FIG. 4 shows an embodiment in which burner flame 25 flows from second aperture 62 (to oxidize the precursor mixture flowing from central aperture 60) and a second flame flows from additional aperture 64.

The inventors of the present disclosure found that optimizing the conditions of burners 24 can reduce the striae dimensions in the produced boule. More specifically, the inventors of the present disclosure found that increasing the flow rate of oxygen gas ejected from burners 24 and decreasing the flow rate of the titanium-containing silica glass precursor mixture ejected from burners 24 results in striae with reduced dimensions in the produced boule. The striae in the produced boule have a reduced magnitude (e.g., reduced size) and a reduced spacing between adjacent striae. Reduction of the size of the striae, as disclosed herein, comprises reduction in the height of the striae as measured in a direction perpendicular to a longitudinal length of the boule (e.g., perpendicular to the diameter of the boule). Reduction in the spacing between adjacent striae, as disclosed herein, comprises reduction between adjacent striae in a direction along the longitudinal length of the boule (e.g., along the diameter of the boule). The reduction in these striae dimensions advantageously produces a more uniform glass body 55. Thus, modifying the flow rate of the oxygen gas and of the titanium-containing silica glass precursor mixture, as disclosed herein, changes the conditions of burner flames 25 and results in a more unfirm deposition of glass body 55.

Striae are variations of the homogeneity in a glass substance. Such variations may be over a distance of about 0.1 mm to about 2 mm. In some embodiments, striae are variations due to inhomogeneous titanium concentrations in a glass substance. The size (e.g., average height) of striae is directly proportional to the homogenous titanium concentration in a glass substrate. Therefore, a first glass substrate with a more consistent and homogenous concentration of titanium along the length of the glass substrate would comprise striae having a relatively smaller average height than a second glass substrate with a concentration of titanium that is more inconsistent and fluctuates along the length of the glass substrate. The first glass substrate would polish more evenly along its length as compared to the second glass substrate, as different concentrations of titanium in a glass substrate polish at different rates.

Furthermore, the spacing of striae is directly proportional to the homogenous titanium concentration in a glass substrate. Therefore, a third glass substrate with a more consistent and homogenous concentration of titanium along the length of the glass substrate would comprise striae with smaller spacing between adjacent striae than a fourth glass substrate with a concentration of titanium that is more inconsistent and fluctuates along the length of the glass substrate. The third glass substrate would polish more evenly along its length as compared to the fourth glass substrate.

In some embodiments, in order to reduce the size and spacing of striae in glass body 55 (and, thus, in the produced boule), the precursor mixture flows from bottom surface 26 of burners 24 (e.g., from central aperture 60) as a gas with a mass flow rate of less than about 5.1 grams/min, or less than about 5.0 grams/min, or less than about 4.9 grams/min, or less than about 4.8 grams/min, or less than about 4.7 grams/min, or less than about 4.6 grams/min, or less than about 4.5 grams/min, or in the range from about 1.0 gram/min to about 5.1 grams/min, or from about 1.0 gram/min to less than about 5.1 grams/min, or from about 1.0 gram/min to less than about 5.0 grams/min, or from about 1.0 gram/min to less than about 4.9 grams/min, or from about 1.0 gram/min to less than about 4.8 grams/min, or from about 1.0 gram/min to less than about 4.7 grams/min, or from about 1.0 gram/min to less than about 4.6 grams/min, or from about 1.0 gram/min to less than about 4.5 grams/min. In some embodiments, the precursor mixture is ejected from bottom surface 26 with a mass flow rate of about 2.0 grams/min to about 4.8 grams/min, or about 2.0 grams/min to about 4.5 grams/min, or about 2.2 grams/min to about 4.3 grams/min, or about 3.0 grams/min to about 4.0 grams/min.

In some embodiments, in order to reduce the size and spacing of striae in glass body 55 (and, thus, in the produced boule), the oxygen gas that flows from bottom surface 26 of burners 24 (e.g., from second aperture 62) to oxidize the precursor mixture flows with a volumetric flow rate of greater than about 12.0 standard liters per minute (SLPM), or greater than about 12.5 SLPM, or greater thana bout 13.0 SLPM, or greater than about 13.5 SLPM, or greater than about 14.0 SLPM, or greater than about 14.5 SLPM, or in the range from about 12.0 SLPM to about 20.0 SLPM, or about 13.0 SLPM to about 15.6 SLPM, or about 14.0 SLPM to about 15.0 SLPM, or about 14.2 SLPM to about 14.8 SLPM, or about 14.0 SLPM, or about 14.3 SLPM, or about 14.5 SLPM, or about 14.7 SLPM, or about 14.8 SLPM, or about 15.0 SLPM.

A ratio of the flow rate of oxygen gas to the flow rate of the precursor mixture ejected from burners 24 may be greater than about 2.35, or in a range from about 2.35 to about 4.0, or about 3.0 to about 3.8, or about 3.06 to about 3.7, or about 3.2 to about 3.6, or about 3.37 to about 3.54, or about 3.4 to about 3.5. The ratio of the flow rate of oxygen gas to the flow rate of the precursor mixture ejected from burners 24 can be controlled by changing the amount of silicon-containing precursor 42 and/or the amount of titanium-containing precursor 47 delivered to conduits 22.

Glass body 55 (and, thus, the boules produced according to the embodiments of the present disclosure) have striae with reduced dimensions (e.g., reduction in height and/or spacing). Glass body 55 (and, thus, the produced boule) also has a more homogenous concentration of titanium as compared with glass bodies made from conventional processes. The titanium content in glass body 55 (and, thus, in the produced boule) may be between about 1 wt. % and about 10 wt. %, or between about 2 wt. % and about 9 wt. %, or between about 4 wt. % and about 9 wt. %, or between about 5 wt. % and about 9 wt. %, or between about 2 wt. % and about 7 wt. %, or between about 4 wt. % and about 7 wt. %.

Glass body 55 (and, thus, the produced boule) may have a CTE of about −30 ppb/° C. to about +30 ppb/° C. at a temperature between 15° C. and 30° C. In some embodiments the CTE is about −10 ppb/° C. to about +10 ppb/° C. at a temperature between 15° C. and 30° C., or about −5 ppb/° C. to about +5 ppb/° C. at a temperature between 15° C. and 30° C., or about −2 ppb/° C. to about +2 ppb/° C. at a temperature between 15° C. and 30° C., or about −1 ppb/° C. to about +1 ppb/° C. at a temperature between 15° C. and 30° C., or about 0 ppb/° C. at a temperature between 15° C. and 30° C.

The relative amount of precursor materials 42, 47 may be adjusted to achieve the desired CTE in the boule. In some embodiments, a titanium content of about 6.8 wt. % to about 7.8 wt. % is used to achieve a CTE of about 0 ppb/° C. at a temperature between 15° C. and 30° C.

A variation of CTE in glass body 55 (and, thus, in the produced boule) may less than about 5 ppb/° C. at a temperature between 15° C. and 30° C., or less than about 4 ppb/° C. at a temperature between 15° C. and 30° C., or less than about 3 ppb/° C. at a temperature between 15° C. and 30° C., or less than about 3 ppb/° C. at a temperature between 15° C. and 30° C., or less than about 2 ppb/° C. at a temperature between 15° C. and 30° C., or less than about 1 ppb/° C. at a temperature between 15° C. and 30° C., or less than about 0.5 ppb/° C. at a temperature between 15° C. and 30° C.

Although FIGS. 1 and 2 only show three burners 24, more or less burners may be used in system 10. For example, system 10 may comprise only one burner 24, or two or more burners 24, or four or more burners 24, or six or more burners 24, or twelve or more burners 24, or twenty-four or more burners 24, or forty-eight or more burners 24. Each burner 24 in system 10 may be the same, or the burners 24 may have different configurations from each other. For example, with reference to FIG. 3, each burner 24 in system 10 may comprise the same or different number of apertures (60, 62, 64) in the same or different configurations. In some embodiments, the apertures (60, 62, 64) have generally the same size, respectively, amongst the different burners 24, while in other embodiments, one or more apertures may be different from one or more of their respective apertures in a different burner.

An exemplary silica-titania boule was prepared according to the processes disclosed herein. First, octamethylcyclotetrasiloxane (a silicon-containing precursor) and titanium isopropoxide (a titanium-containing precursor) where mixed to form a precursor mixture that was flowed into burners 24, along with a fuel and oxygen mixture. In this example, burners 24 each ejected oxygen gas (to oxidize the precursor mixture) at a flow rate of 14.5 SLPM and ejected the precursor mixture at a flow rate of 4.3 grams/min. A ratio of the flow rate of oxygen gas to the flow rate of the precursor mixture ejected from burners 24 was 3.37. The precursor mixture ejected from burners 24 was oxidized to form glass particles 50 (using burner flames 25), which were then deposited on collection cup 35 as glass body 55. Glass body 55 was then cooled in furnace to form a boule, which was not subject to any further mixing steps. The boule was then measured to determine the amount striae, the results of which are described below with reference to FIGS. 5-7.

Figure 5:
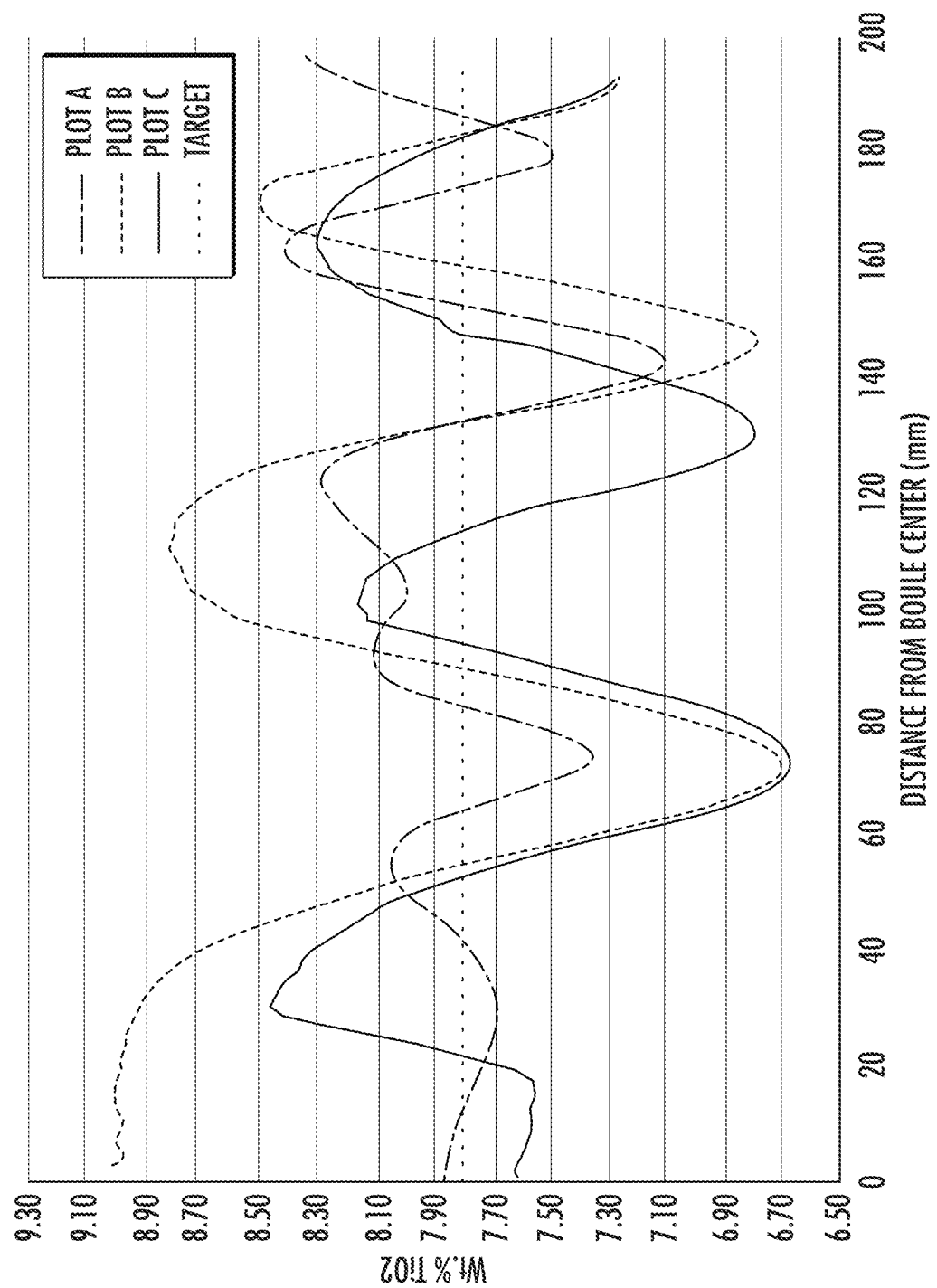
FIG. 5 shows plots of titanium oxide concentration vs. radial position in an exemplary glass boule made according to embodiments of the present disclosure and of comparative glass boules.

FIG. 5 is a plot of the content of titanium oxide (wt. %) in a boule vs. the radial distance from the center of the boule for a variety of boules produced using different methods. Thus, FIG. 5 shows the distribution of titanium oxide in the different boules. It is noted that FIG. 5 only shows a portion of the boules and not the entire length of the boules. Plot A of FIG. 5 depicts a boule prepared according to the processes disclosed in the above exemplary process. Thus, the boule of Plot A was prepared so that burners 24 each ejected oxygen gas a rate of 14.5 SLPM and ejected the precursor mixture at a flow rate of 4.3 grams/min. A ratio of the flow rate of the oxygen gas to the flow rate of the precursor mixture ejected from burners 24 was 3.37.

The boule of Plot B was prepared according to a traditional process in which the burners each ejected oxygen gas at a rate of 12 SLPM and ejected the precursor mixture at a flow rate of 5.1 grams/min. A ratio of the flow rate of the oxygen gas to the flow rate of the precursor mixture ejected from the burners 24 was 2.35. Thus, the boule of Plot A had an increased oxygen flow rate and a decreased precursor mixture flow rate compared to the boule of Plot B.

Plot C also shows a comparative example boule in which only the oxygen flow rate is increased compared to the traditional process of Plot B (it is noted, as discussed above, that the exemplary boule of Plot A not only increases the oxygen flow rate compared to Plot B but also decreases the precursor mixture rate). In the boule of Plot C, the burners each ejected oxygen gas at a rate of 15.6 SLPM and ejected the precursor mixture at a flow rate of 5.1 grams/min. A ratio of the flow rate of the oxygen gas to the flow rate of the precursor mixture ejected from the burners 24 was 3.06.

As further shown in FIG. 5, Plot A is closer to the target titanium oxide concentration of 7.8 wt. % throughout the length of the boule depicted. Thus, the boule of Plot A provides a more uniform and homogenous titanium oxide concentration than either the boule of Plot B or the boule of Plot C. The boule of Plot A, therefore, has striae with reduced dimensions compared to the boules of Plot B or of Plot C. It is noted that 7.8 wt. % of titanium oxide is used as the target concentration in order to achieve a CTE of 0 ppb/° C. at a temperature between 15° C. and 30° C. in the produced boules.

It is further noted that Plots A, B, and C of FIG. 5 all used octamethylcyclotetrasiloxane as the silicon-containing precursor and titanium isopropoxide as the titanium-containing precursor. Additionally, all plots used a furnace with twenty-four burners. The titanium oxide concentration data of FIG. 5 was obtained using micro XrF analysis in which the boule samples were excited with high-energy X-rays. During the data measurements, the boules were not rotated in the x-y direction to allow the titanium oxide distribution to be measured while minimizing any influence of the neighboring burners.

FIGS. 6A through 6D illustrate the changes in optical retardation (due to the reduction of striae in the produced boules) when forming boules in accordance with the processes disclosed herein. It is noted that the size and spacing of striae is directly related to optical retardation, so that a boule with striae having a larger size and with increased spacing between the striae would have greater optical retardation. In FIGS. 6A through 6D, the y-axis represents the optical retardation (nm) of the boules, while the x-axis represents a length of the boules as a pixel with a pixel size of about 0.0085 microns per pixel. Boule A of FIGS. 6A through 6D was made in accordance with the exemplary process disclosed above for Plot A (with reference to FIG. 5). Boule B of FIGS. 6A through 6D was made in accordance with the traditional process disclosed above for Plot B (with reference to FIG. 5). A comparison of Boules A and B in FIG. 6A clearly shows that there is less optical retardation in Boule A than Boule B, giving a clear indication of striae reduction using the processes disclosed herein.

Figure 6A:
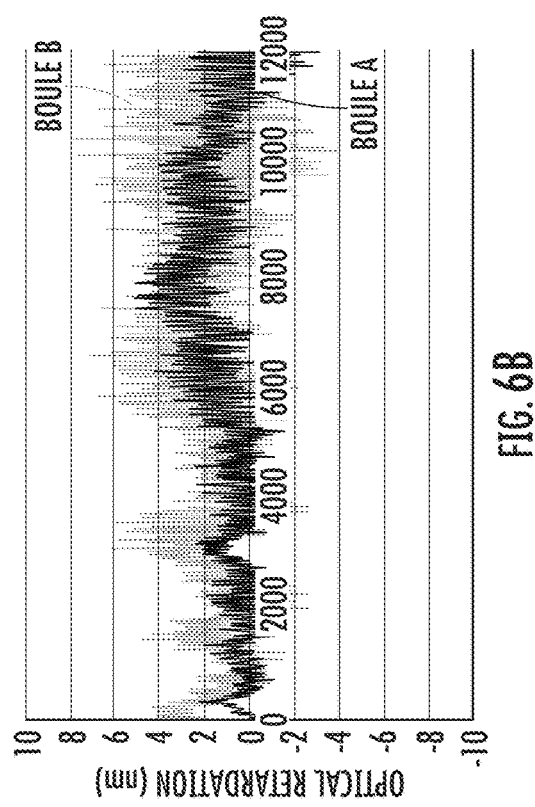
FIGS. 6A through 6D depict the birefringence magnitude due to striae vs. radial position in an exemplary glass boule made according to embodiments of the present disclosure and of a comparative glass boule.

The mark on the plot of FIG. 6A at point x is merely due to a process change during the recorded measurements and is not indicative of the true optical retardation of the boules at this mark. The plots of Boules A and B in FIGS. 6A-6D were measured using a micro polarimeter.

Figure 6B:
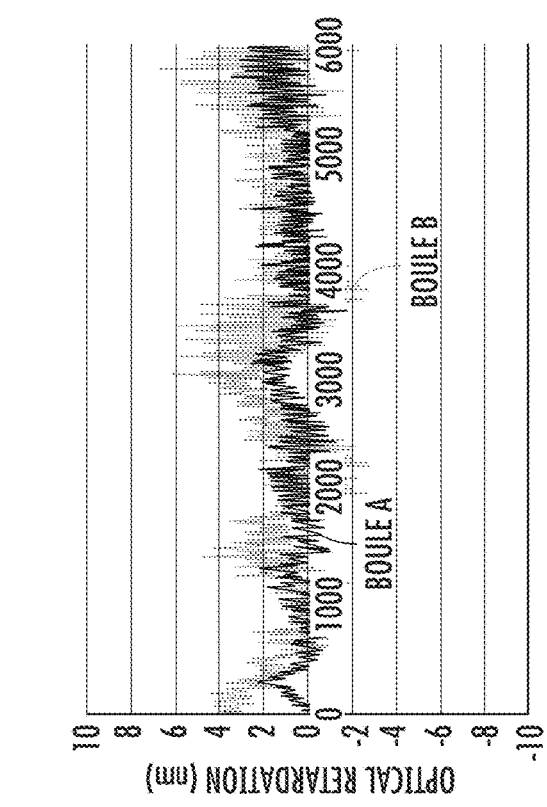
Figure 6C:
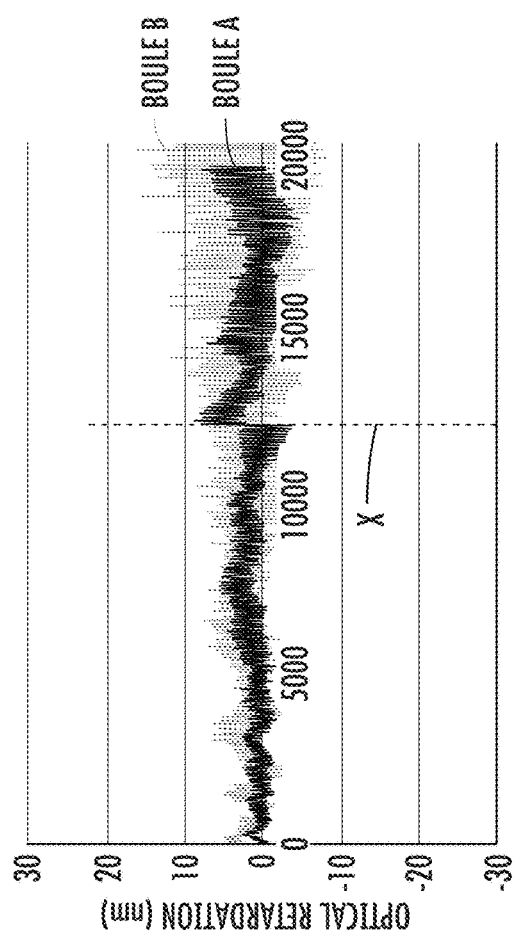
Figure 6D:
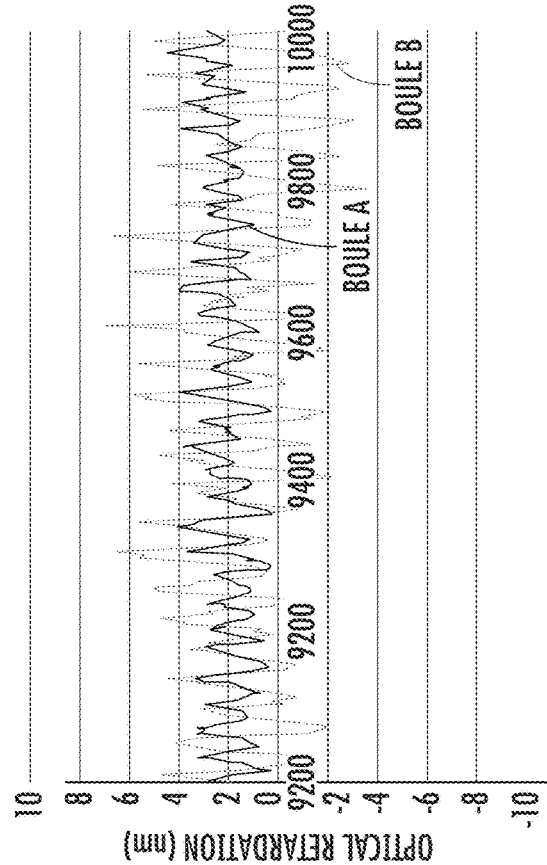

FIGS. 6B through 6D are further illustrations of the striae reduction for Boules A and B for subsections of the boules. In particular, FIG. 6B shows a first section of the bottom 100 mm of the boules. FIG. 6C shows a section positioned adjacent to the first section of the boules and having a length of about 0.33 mm. And FIG. 6D shows a section positioned at the bottom 50 mm of the boules. It is noted that the sections of FIGS. 6B and 6D overlap. Additionally, the section of FIG. 6D overlaps with that of FIG. 6C. The data shown in FIGS. 6A-6C clearly shows that the processes of the disclosed embodiments reduce the optical retardation of the boule, and thus the striae dimensions, compared to the traditional processes. More specifically, the processes disclosed herein reduce the size (e.g., height) of striae in a boule by about 40% or more, as compared to the traditional processes. In some embodiments, the processes disclosed herein reduce the size (e.g., height) of striae in a boule by about 50% or more, or about 60% or more, or about 70% or more, or about 80% or more, or about 90% or more, or about 100% or more, as compared to the traditional processes.

In embodiments, the average striae height in the glass bodies produced using the exemplary processes disclosed herein and throughout the entire length of the glass body is in a range from about 0.25 nm to about 10.0 nm, or about 0.5 nm to about 8.0 nm, or about 1.0 nm to about 6.0 nm, or about 1.2 nm to about 5.9 nm, or about 1.3 nm to about 5.8 nm, or about 1.5 nm to about 5.6 nm, or about 1.7 nm to about 5.4 nm, or about 2.0 nm to about 5.2 nm, or about 2.2 nm to about 5.0 nm, or about 2.4 nm to about 4.8 nm, or about 2.7 nm to about 4.5 nm, or about 2.9 nm to about 4.3 nm, or about 3.0 nm to about 4.0 nm, or about 3.2 nm to about 3.9 nm or about 3.3 nm to about 3.6 nm, or any combination of these endpoints.

Furthermore, in embodiments, the average spacing between adjacent striae in the glass bodies produced using the exemplary processes disclosed herein and throughout the entire length of the glass body is about 0.55 mm or less, or about 0.50 mm or less, or about 0.45 mm or less, or about 0.40 mm or less, or about 0.35 mm or less, or about 0.30 mm or less, or about 0.25 mm or less, or about 0.20 mm or less, or about 0.15 mm or less, or about 0.1 mm or less. In some embodiments, the spacing is in a range from about 0.10 mm to about 0.55 mm, or about 0.15 mm to about 0.50 mm, or about 0.2 mm to about 0.40 mm, or about 0.25 mm to about 0.35 mm, or any combination of these endpoints. The average spacing between adjacent striae is about a 15% reduction along the entire length of a boule when comparing a boule made using the processes disclosed herein with the traditional processes. As discussed above, the average spacing between the adjacent striae may along the longitudinal length of the glass body.

FIG. 7 shows the increased uniformity and homogeneity of titanium concentration in boules produced using the processes disclosed herein as compared to the traditional processes. In FIG. 7, different samples of glass (i.e., samples 1-19) from the same boule were measured for their zero temperature crossing (Tzc) of CTE, which is directly related to titanium oxide concentration (wt. %) in the samples. Therefore, the samples in FIG. 7 with a higher Tzc would also have a higher concentration of titanium oxide. A first portion of the boule (Portion A) was made in accordance with the exemplary process disclosed above for Plot A (with reference to FIG. 5). A second portion of the boule (Portion B) was made in accordance with the traditional process disclosed above for Plot B (with reference to FIG. 5). No measurements were conducted at Portion X of the boule, as this was during the transition from the exemplary process to the traditional process.

The Tzc in each sample (1-19) of the boule is plotted as a function of the radius (inches) of the boule in FIG. 7. Therefore, as shown in FIG. 7, Portion A includes the portions of samples 1-19 from the 0.50 inch radial position to the 2.00 inch radial position of the boule. Portion B includes the portions of samples 1-19 from the 3.00 inch radial position to the 6.25 inch radial position of the boule.

The standard deviation (STD) for the Tzc was then calculated for each radial position across the 19 samples. For example, the STD of the Tzc at the radial position of 2.00 inches was 0.9. As another example, the STD of the Tzc at the radial position of 6.25 inches was 1.8. FIG. 7 shows that Portion A overall has lower STD values than Portion B across the radial positions indicated. Therefore, Portion A (made by the processes disclosed herein) has a more uniform dispersion of titanium oxide as compared with Portion B (made by the standard processes). As discussed above, the uniformity of titanium in a glass sample is related to the striae dimensions in that glass sample. Therefore, the samples of Portion A (made by the processes disclosed herein) have reduced striae dimensions as compared with the samples of Portion B (made by the standard processes).

As discussed above, the processes disclosed herein produce glass bodies and, thus, boules with striae of reduced dimensions. Reduction in the dimensions of the striae refers to reduction in size of the striae and/or reduction in spacing between adjacent striae. Reduction in size may refer to reduction in the height of the striae as measured in a direction perpendicular to a longitudinal length of the boule (e.g., perpendicular to the diameter of the boule).

Figure 8:
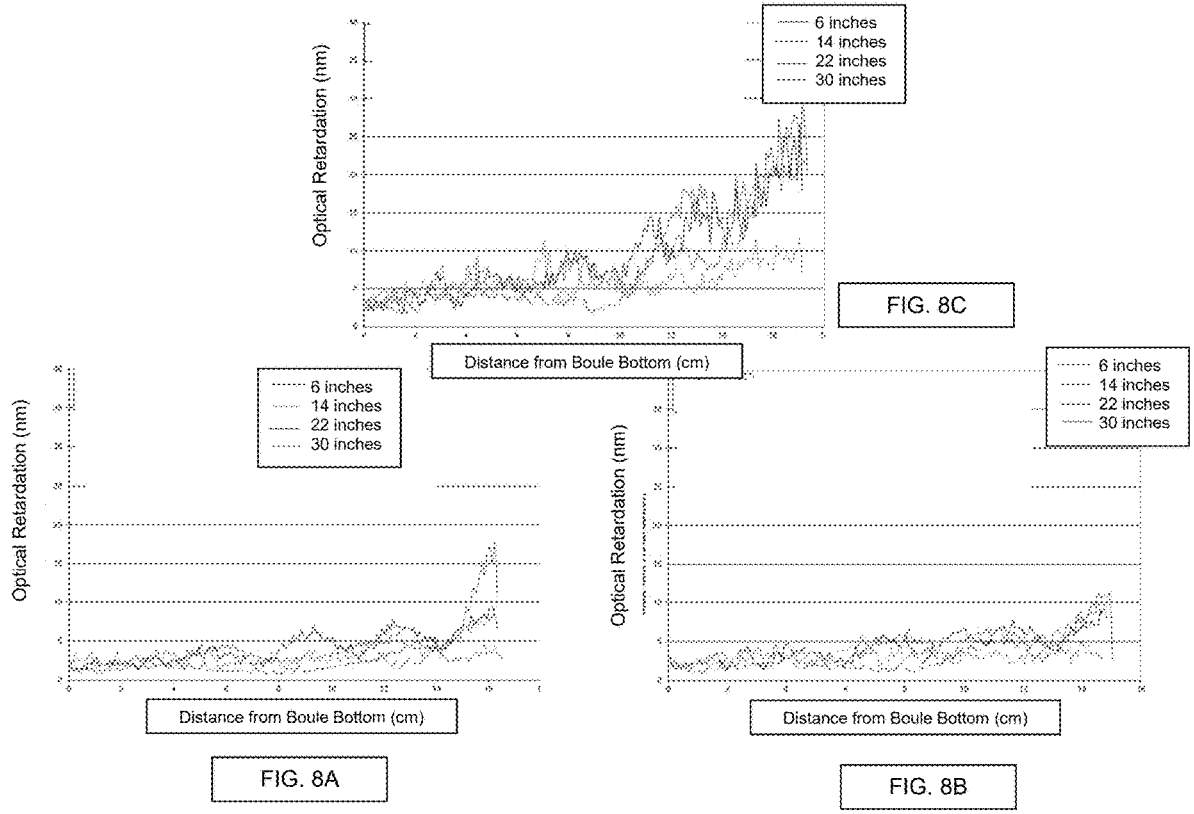
FIGS. 8A-8C depict the birefringence magnitude due to striae vs. radial position in exemplary glass boules made according to embodiments of the present disclosure and of a comparative glass boule.

FIGS. 8A-8C illustrate changes in optical retardation due to the reduction in striae dimensions in produced boules. More specifically, FIGS. 8A and 8B each show the optical retardation of a boule made in accordance with the exemplary process disclosed above for Plot A of FIG. 5, and FIG. C shows the optical retardation of a boule made in accordance with the traditional process disclosed above for Plot B of FIG. 5. The boules of FIGS. 8A-8C were sectioned into different samples at the 6 inch, 14 inch, 22 inch, and 30 inch locations along the length (e.g., diameter) of the boule. FIGS. 8A-8C show that the exemplary boules of FIGS. 8A and 8B have an overall lower optical retardation than the comparison boule of FIG. 8C.

Furthermore, the boules of FIGS. 8A-8C were also measured for their striae height, the results of which are shown in Tables 1-3 below. Each boule was sectioned into the different samples at the 6 inch, 14 inch, 22 inch, and 30 inch locations along the length (as discussed above). Additionally, each of these samples was further divided into a top, middle, and bottom portion of the sample. The top portion represents the top one-third of the sample along its length, the middle portion represents the middle one-third of the sample along its length, and the bottom portion represents the bottom one-third of the sample along its length. The maximum striae height per 0.1 cm length of each sample was then measured. These maximum striae height values were then averaged together for each of the top, middle, and bottom portions of each sample. The average striae height values are shown below in Tables 1-3. Thus, the average striae height values of Tables 1-3 represent the average of each of the maximum striae heights per a 0.1 cm length of the sample.

Table 1 below provides the average striae height per 0.1 cm length (for each sample measured at the 6 inch, 14 inch, 22 inch, and 30 inch locations) of the exemplary boule corresponding to FIG. 8A.

TABLE 1

Average Stria Height per 0.1 cm Length

| | | Region of Sample | | |
|---|---|---|---|---|
| Sample Number | Radius of Boule | Top Portion | Middle Portion | Bottom Portion |
| 1 | 6 inches | 5.9 nm | 1.3 nm | 1.6 nm |
| 2 | 14 inches | 5.2 nm | 3.2 nm | 2.3 nm |
| 3 | 22 inches | 5.9 nm | 3.9 nm | 2.3 nm |
| 4 | 30 inches | 2.9 nm | 2.7 nm | 2.7 nm |

Table 2 below provides the average striae height per 0.1 cm length (for each sample measured at the 6 inch, 14 inch, 22 inch, and 30 inch locations) of the exemplary boule corresponding to FIG. 8B.

TABLE 2

Average Stria Height per 0.1 cm Length

| | Radius of | Region of Sample | | |
|---|---|---|---|---|
| Sample Number | Sample Measured | Top Portion | Middle Portion | Bottom Portion |
| 5 | 6 inches | 4.9 nm | 1.7 nm | 1.8 nm |
| 6 | 14 inches | 6.0 nm | 3.6 nm | 2.5 nm |
| 7 | 22 inches | 5.9 nm | 3.9 nm | 2.7 nm |
| 8 | 30 inches | 3.3 nm | 3.5 nm | 2.9 nm |

Table 3 below provides the average stria height per 0.1 cm length (for each sample measured at the 6 inch, 14 inch, 22 inch, and 30 inch locations) of the comparison boule corresponding to FIG. 8C.

TABLE 3

Average Stria Height per 0.1 cm Length

| | Radius of | Region of Sample | | |
|---|---|---|---|---|
| Sample Number | Sample Measured | Top Portion | Middle Portion | Bottom Portion |
| 9 | 6 inches | 15.4 nm | 3.6 nm | 3.4 nm |
| 10 | 14 inches | 13.4 nm | 6.2 nm | 4.5 nm |
| 11 | 22 inches | 14.9 nm | 7.2 nm | 4.5 nm |
| 12 | 30 inches | 7.0 nm | 5.9 nm | 5.1 nm |

As shown above in Tables 1-3, the exemplary boules of FIGS. 8A and 8B have overall lower average striae heights as compared to the comparison boule of FIG. 8C. For example, the top portion of the exemplary boule samples of FIGS. 8A and 8B have an average striae height ranging from 2.9 nm to 6.0 nm. However, the top portion of the comparison boule samples of FIG. 8C have average striae height ranging from 7.0 nm to 15.4 nm. Thus, Tables 1-3 above and FIGS. 8A-C clearly show that the processes disclosed herein produce boules with reduced optical retardation and with reduced striae height.

Figure 9:
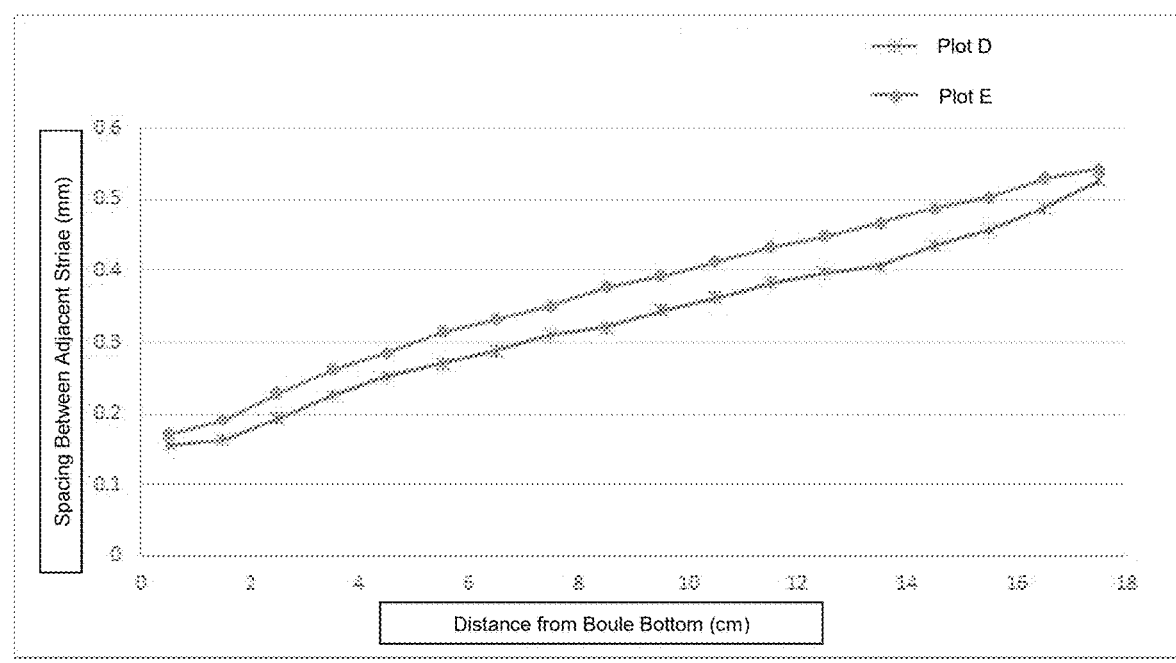
FIG. 9 depicts the spacing between adjacent striae vs. radial position in exemplary glass boules made according to embodiments of the present disclosure and of comparative glass boules.

FIG. 9 shows a comparison of spacing between adjacent striae of boules made using the exemplary processes disclosed herein and those made using the traditional processes. Plot D of FIG. 9 corresponds to boules made in accordance with the exemplary process disclosed above for Plot A of FIG. 5. The average spacing of eight boules made in accordance with the exemplary processes were used to obtain the measurements of Plot D. Plot E of FIG. 9 corresponds to boules made in accordance with the traditional process disclosed above for Plot B of FIG. 5. The average spacing of thirty-one boules made in accordance with the traditional processes were used to obtain the measurements of Plot E. Furthermore, the measurements of Plots D and E show the average spacing of the striae at a 22 inch radius sample of the boules.

As shown in FIG. 9, the average spacing between the striae is reduced in the boules made according to the exemplary processes as compared to the boules made in accordance with the traditional processes. The spacing is reduced by about 15% along the length of the boules.

Embodiments of the present disclosure also include a titania-doped silica glass article made according to the processes disclosed herein with additional finishing processing steps. As known in the art, the finishing processing steps may include, for example, cutting, grinding, polishing, embossing, flameworking, etching, and coating. In some embodiments, the titania-doped article is a lens, a mirror blank, a photolithography mask, a support structure, a window, or a prism.

The titania-doped glasses disclosed herein may be extremely pure. In some embodiments, the titania-doped silica materials consist essentially of oxides of titanium and silicon along with a small amount of dissolved water. In other embodiments, other species may be included in the titania-doped silica. For example, the titania-doped silica may contain small amounts of cerium and/or aluminum.

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various needs as would be appreciated by one of skill in the art.

It is to be understood that the phraseology or terminology used herein is for the purpose of description and not of limitation. The breadth and scope of the present disclosure should not be limited by any of the above-described exemplary embodiments, but should be defined only in accordance with the following claims and their equivalents.

We claim:

1. A process for producing a glass body, the process comprising:
    flowing oxygen gas from a burner in a furnace at a flow rate in a range of about 12.0 standard liters per minute to about 15.6 standard liters per minute;
    flowing a precursor gas mixture from the burner at a flow rate of less than 5.1 grams/minute, the precursor gas mixture comprising a silicon-containing precursor and a titanium-containing precursor;
    oxidizing the precursor gas mixture with the oxygen gas to form glass particles; and
    depositing the glass particles on a collection cup to form the glass body,
    wherein the glass body comprises a titanium content in a range of about 1 wt. % to about 10 wt. %.

2. The process of claim 1, wherein the glass body is a boule.

3. The process of claim 1, wherein the flow rate of the oxygen gas is in a range of about 13.0 standard liters per minute to about 15.6 standard liters per minute.

4. The process of claim 3, wherein the flow rate of the oxygen gas is in a range of about 14.0 standard liters per minute to about 15.0 standard liters per minute.

5. The process of claim 1, wherein the flow rate of the precursor gas mixture is in a range of about 1.0 grams/min to less than about 5.1 grams/min.

6. The process of claim 5, wherein the flow rate of the precursor gas mixture is in a range of about 2.0 grams/min to less than about 4.5 grams/min.

7. The process of claim 1, wherein a ratio of the flow rate of the oxygen gas to a flow rate of the precursor gas mixture from the burner is greater than 2.35.

8. The process of claim 7, wherein the ratio is in a range of about 3.0 to about 3.8.

9. The process of claim 8, wherein the ratio is in a range of about 3.2 to about 3.6.

10. The process of claim 1, wherein the silicon-containing precursor is octamethylcyclotetrasiloxane.

11. The process of claim 1, wherein the titanium-containing precursor is titanium isopropoxide.

12. The process of claim 1, wherein a variation of CTE in the glass body is less than about 5 ppb/° C. at a temperature between 15° C. and 30° C.

13. The process of claim 12, wherein the variation of CTE in the glass body is less than about 1 ppb/° C. at a temperature between 15° C. and 30° C.

14. A process for producing a glass body, the process comprising:
    flowing oxygen gas from a burner in a furnace at a flow rate of greater than 12.0 standard liters per minute;
    flowing a precursor gas mixture from the burner at a flow rate of less than 5.1 grams/minute;
    oxidizing the precursor gas mixture with the oxygen gas to form glass particles; and
    depositing the glass particles on a collection cup in the furnace to form the glass body,
    wherein the precursor gas mixture comprises a silicon-containing precursor and a titanium-containing precursor, and
    wherein a ratio of the flow rate of the oxygen gas to the flow rate of the precursor gas mixture from the burner is in a range of about 2.35 to about 4.0.

15. The process of claim 14, wherein the flow rate of the precursor gas mixture is in a range of about 1.0 grams/min to less than about 5.1 grams/min.

* * * * *